Patented Nov. 29, 1932

1,888,978

UNITED STATES PATENT OFFICE

GARLAND H. B. DAVIS, OF BATON ROUGE, LOUSIANA, ASSIGNOR TO STANDARD-I. G. COMPANY

METHOD OF PREPARING CATALYTIC MATERIALS

No Drawing. Application filed November 29, 1930. Serial No. 499,127.

This invention relates to the preparation of catalytic materials and more specifically comprises a method of preparing an active form of molybdenum trioxide for use as a catalyst, particularly in the hydrogenation of carbonaceous materials.

Molybdenum trioxide either alone or in admixture with the oxides or sulfides of metals of the second and fourth groups of the periodic system, such as zinc or magnesium, is used as a catalyst in the high pressure hydrogenation of carbonaceous materials, hydrocarbon oils and the like. I have found that molybdenum trioxide in the form of crystals, which sparkle in sunlight and appear under the microscope to have a rod-shaped structure, is especially active and suitable for this purpose. The method by which these rod-shaped crystals can be prepared from the apparently amorphous material will be fully understood from the following description.

Molybdenum trioxide is first dissolved in an alkali, such as ammonia, preferably a solution containing 6 to 7% ammonia, although other alkalies may be used. The resulting solution of molybdenum trioxide in alkali is then concentrated, for example by evaporation, to a specific gravity greater than 1.0 and preferably between about 1.2 and 1.4. The molybdic acid is then precipitated from the concentrated alkaline solution by the addition of a suitable excess of an acidic substance. Hydrochloric acid may be conveniently used as the precipitant and is added until the mixture contains from 1 to 4% excess acid, preferably about 3%. If other acids are used they are added in such amount that the hydrogen ion concentration of the resulting mixture is substantially equivalent to that of mixtures containing from 1 to 4% excess hydrochloric acid. The precipitated acid is then separated, for example by filtration or centrifuging, and is washed with water or a dilute ammonium chloride solution, and dried, preferably at 200 or 212° F.

The thoroughly dried acid is then heated at an elevated temperature for a prolonged period until crystals of the desired size are formed. The temperature of heating is preferably above about 750° F. and below about 1500° F. at which temperature molybdic acid sublimes. Temperature up to about 1100° F. may be safely used, but I have found that a temperature between about 780 and 840° F. is particularly advantageous for the formation of suitable crystals.

It will be understood that the length of time it is necessary to heat the acid will largely depend upon the care with which the precipitation and heating have been carried out and that it may be continued as long as necessary to produce the desired sized crystals. If prolonged heating does not produce the sparkling rod-shaped crystals, the cause is incorrect procedure in precipitation, and it is necessary to re-dissolve and reprecipitate the acid. I have found that in general heating for a period of 2 to 10 hours, or more, at about 840° F. is ordinarily sufficient to produce crystals of suitable size.

Crystals of molybdenum trioxide prepared according to the above procedure may then be molded into the form of cubes, spheres or other shapes, or they may be mixed with a bonding agent such as magnesium or zinc oxide, which may also have catalytic properties, and the mixture pressed into lumps of convenient size. The molybdenum trioxide may also be mixed with other catalytic materials such as tungsten or chromium oxides or sulfides, or may be deposited on inert materials which have a large surface, such for example, as alumina, silica, pumice, activated charcoal and the like. All such mixtures may be prepared in lumps of convenient shape and size for support on trays, or by other means, in reactors suitable for the high pressure hydrogenation of carbonaceous material, or they may be finely ground and suspended in the material to be treated.

This invention is not limited by any theory of the mechanism of the crystallization nor by any specific details given for illustrative purposes, but only by the following claims in which I wish to claim all novelty inherent in the invention.

I claim:
1. Method of preparing an active form of molybdenum trioxide from a less active form, which comprises dissolving the acid in an alkali, precipitating molybdic acid from the alkaline solution by addition of an excess of an acidic substance, separating the precipitate, and heating it for a prolonged period at a temperature above about 750° F. and below about 1500° F.

2. Method according to claim 1 in which the alkali solvent is a 6 to 7% solution of ammonia.

3. Method according to claim 1 in which the solution of molybdenum trioxide in alkali is concentrated to a specific gravity between about 1.2 and 1.4 before precipitation.

4. Method according to claim 1 in which the molybdic acid is precipitated from solution by an acidic substance added in such amount that the resulting mixture has a hydrogen ion concentration equivalent to that of mixtures containing from 1 to 4% excess of hydrochloric acid.

5. Method according to claim 1 in which the molybdic acid is precipitated by hydrochloric acid added until the mixture contains about 3% excess acid.

6. Method according to claim 1 in which the precipitated molybdic acid is heated at a temperature between about 780 and 840° F. for a period of from 2 to 10 hours.

7. Method of converting molybdenum trioxide from a less active form to a more active form for catalytic purposes which comprises dissolving the acid in ammonia, concentrating the solution to a specific gravity above about 1.0, precipitating the acid by addition of hydrochloric acid until the acid concentration is about 3%, separating the precipitate, and drying and heating for a prolonged period at a temperature between about 750 and 1100° F.

GARLAND H. B. DAVIS.